United States Patent [19]

Dixon et al.

[11] 4,239,077
[45] Dec. 16, 1980

[54] METHOD OF MAKING HEAT CURABLE ADHESIVE COATED INSULATION FOR TRANSFORMERS

[75] Inventors: George D. Dixon, Monroeville; Edward J. Croop, Pittsburgh, both of Pa.

[73] Assignee: Westinghouse Electric Corp., Pittsburgh, Pa.

[21] Appl. No.: 965,554

[22] Filed: Dec. 1, 1978

[51] Int. Cl.² .............................................. B05D 3/06
[52] U.S. Cl. .................................. 156/272; 156/313; 156/330; 427/54.1; 427/208; 427/208.2
[58] Field of Search ............... 427/44, 54, 116, 207 R, 427/207 A, 208; 260/837 R; 156/272, 306, 309, 313, 330

[56] References Cited

U.S. PATENT DOCUMENTS

| | | | |
|---|---|---|---|
| 3,246,271 | 4/1966 | Ford | 336/94 |
| 3,551,270 | 12/1970 | Sharkey | 156/313 |
| 3,723,223 | 3/1973 | LeCompte | 156/306 |
| 3,935,330 | 1/1976 | Smith et al. | 427/54 |
| 3,974,302 | 8/1976 | Croop et al. | 427/21 |
| 4,004,061 | 1/1977 | Creighton et al. | 156/313 |
| 4,017,453 | 4/1977 | Heilman et al. | 260/837 R |
| 4,025,407 | 5/1977 | Chang et al. | 427/44 |
| 4,092,443 | 5/1978 | Green | 260/837 R |
| 4,126,505 | 11/1978 | Garnish et al. | 260/837 R |

Primary Examiner—John H. Newsome
Attorney, Agent, or Firm—D. P. Cillo

[57] ABSTRACT

A flexible resin adhesive coated substrate is made by: (A) coating a sheet material with a wet, heat reactive adhesive resin, containing a monomer and an amount of an ultraviolet radiation sensitive photoinitiator effective to cause polymerization of monomer in response to ultraviolet radiation, and (B) applying ultraviolet radiation to the adhesive resin coating on the sheet material to polymerize monomer without the application of heat, forming a dry, uncured coating of adhesive bonded to the sheet material.

8 Claims, 2 Drawing Figures

METHOD OF MAKING HEAT CURABLE ADHESIVE COATED INSULATION FOR TRANSFORMERS

BACKGROUND OF THE INVENTION

In the transformer coil art, a number of methods have been adapted for holding or anchoring the turns of an electrical coil, so that they can resist movement when the turns are subjected to a flow of current and consequent electromagnetic forces tending to move them out of position.

Discontinuously patterned, resin coated kraft paper has been used as a very effective restraint, to provide porous solidification of transformer coils. Ford, in U.S. Pat. No. 3,246,271, applied the resin pattern by a solution impregnation method, and Croop et al., in U.S. Pat. No. 3,974,302, applied the resin pattern by an electrostatic coating technique. Both methods employ ovens to cure the applied resin.

Kraft paper as purchased contains about 4 wt.% to 15 wt.%, generally about 7 wt.%, moisture. After passing through ovens, with temperatures of up to 250° C., in order to "B"-stage the applied resin, the moisture content of the paper is reduced to about 2 wt.%. The paper tends to become inflexible and brittle below 3.5 wt.% moisture content and may, in some instances, break during the coil winding process, requiring stoppage and rewinding. What is needed is a method to either replace the lost moisture or apply a resin pattern and "B"-stage by a technique which does not cause loss of moisture below 3.5 wt.%.

SUMMARY OF THE INVENTION

Generally, the present invention comprises a method of making an electrical coil, or other type winding, by wrapping flexible tape insulation around a core or a conductor. More particularly, the process involves: (A) applying a coating of heat reactive adhesive resin, containing effective amounts of an acrylate or vinyl monomer and an ultraviolet radiation photoinitiator, onto a porousflexible substrate comprising paper having a moisture content of over about 4 wt.%, and (B) applying ultraviolet radiation to the adhesive resin, preferably by continuously passing the resin coated substrate by an ultraviolet radiation source, to "B"-stage the resin by polymerizing or cross-linking the acrylic or vinyl monomer without the application of heat, so that the moisture content of the substrate remains over 3.5 wt.%. This method produces a flexible insulation and eliminates air pollution and dependence on natural gas.

BRIEF DESCRIPTION OF THE DRAWINGS

For a better understanding of the invention, reference may be made to the preferred embodiments, exemplary of the invention, shown in the accompanying drawings, in which.

DESCRIPTION OF THE PREFERRED EMBODIMENTS

Figure 1:
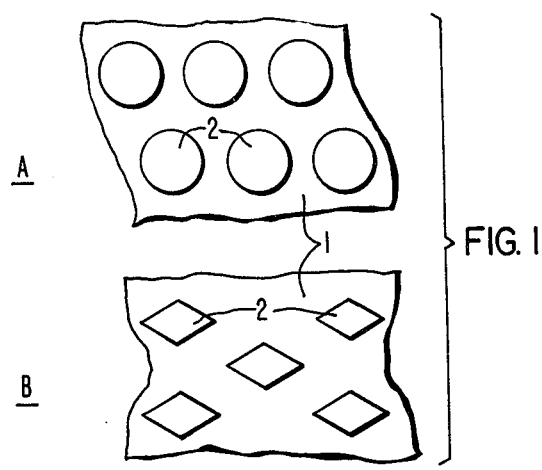
FIGS. 1A and 1B show several typical resin patterns applied to a substrate in the method of this invention.

Referring now to FIG. 1, a flexible, porous substrate 1, in sheet or web form, such as, for example, kraft paper, is shown. This paper will be about 1 mil to about 30 mil (0.025 mm to 0.75 mm) thick and have a moisture content of between about 4 wt.% to about 15 wt.%, generally about 7 wt.%. Preferably, the paper will be thermally stabilized and contain within its interstices an effective amount, generally about 0.02 wt.% to 5 wt.% of a stabilizing agent. Suitable stabilizing agents would include melamine, triethyl melamine, triphenyl melamine, diallyl melamine, tris-tertiary butyl melamine, N-tertiary butyl melamine, dicyandiamide, polyacrylamide, succinonitrile and the like. These materials are well known stabilizers. They are usually added during paper manufacturing and greatly enhance thermal stability in liquid dielectrics.

A resin 2 is applied to the sheet or web substrate, preferably in a pattern, such as a circular, rectangular, or diamond shaped coating, by any suitable technique. In some instances, a continuous resin coating may be applied to the substrate. Thermosetting resins are preferred, since they provide high tensile shear strengths, and are able to resist the physical and thermal stresses found in transformers operating at high temperatures. The preferred means of resin application is by a solution coating method, such as that taught in U.S. Pat. No. 3,246,271, herein incorporated by reference, using rotogravure techniques.

The thermosetting base adhesive resin particularly applicable is an epoxy resin (glycidylpolyether of a dihydric phenol). Epoxy resins are well known in the art. They are generally the reaction products o bisphenol A and epichlorhydrin, and are usually used in conjunction with acid anhydride, amine, amide, or organo metallic heat reactive curing agents. The epoxy resin may be modified by addition of additives such as epoxy esters of dibasic acids and imidazoles, to improve flexibility, cure and bonding to the supporting substrate. The resin system may also contain pigments for coloring. Other suitable thermoset base resins are polyester resins polyurethane resins and polyacrylic resins. The resin used must, of course, be compatible with transformer oil if the tape is to be used in transformers. For a detailed description of all of these resins, their method of preparation, and catalysts and curing agents useful therewith, reference can be made to Brydson, *Plastic Materials*, 1966.

A wide variety of heat reactive catalysts and curing agents, such as metal oxides, peroxides, azo compounds, acid anhydrides, organo-metallics such as organotin or organo-boron compounds, and the like, known to be effective with the particular base resin, can be used in this invention. Effective amounts of such catalysts or curing agents will be between about 0.5 wt.% to about 20 wt.% based on the weight of the thermoset resin. In the preferred epoxy resin system of this invention, the amount of curing agent will range between about 5 wt.% to about 20 wt.% based on epoxy weight. The term "heat reactive adhesive resin" is meant to include the particular resin along with a suitable curing agent or catalyst which will allow heat curing.

In the resin system of this invention, the epoxy or other base resin remains substantially unreacted until final heat curing. The "B"-stage gellation is caused by polymerization or cross-linking of an acrylic or vinyl reactive diluent, by action of the photoinitiator in response to ultraviolet (UV) radiation. The resin system of this invention must contain from about 10 parts to about 80 parts, preferably 20 to 35 parts by weight of an acrylic or vinyl monomer per 100 parts base heat reactive thermoset adhesive resin, such as epoxy.

Useful acrylic monomers are simple acrylates, or multifunctional (di-, tri- or tetra-) acrylates. Useful simple acrylic monomers include 2-ethyl hexyl acrylate; 2-hydroxy ethyl acrylate, and the like; alkoxy ethyl acrylate monomers, such as 2-methoxy ethyl acrylate; 2-ethoxy ethyl acrylate, and the like; and aryl ethyl acrylate monomers, such as 2-phenoxy ethyl acrylate. Useful multifunctional acrylic monomers include hexanediol diacrylate; neopentyl glycol diacrylate; tetra ethylene glycol diacrylate; trimethylol propane triacrylate; pentaerythritol triacrylate, pentaerythritol tetracrylate and the like. Useful vinyl monomers include styrene; vinyl toluene; vinyl pyrrolidone; vinyl acetate; divinyl benzene, and the like. Under 10 parts acrylic or vinyl per 100 parts base resin results in poor solubility of the base resin so that the viscosity of the resin system is unacceptably high. Over 80 parts acrylic or vinyl per 100 parts base resin will reduce the final hardness and adhesive nature of the base resin. The acrylates and vinyls can be used alone or in combination.

Photoinitiators must be added to the resin system in an amount effective to respond to UV light and to initiate and cause substantial polymerization of the acrylic or vinyl monomers, in order to "B"-stage the resin. The "B"-stage results by the use of UV radiation, without heat, i.e., gelling the monomers in the resin system to a point where the entire system becomes fusible and dry to the touch, yet flexible and capable of subsequent complete cure by heating between about 100° C. and 220° C. This subsequent heating will cause a reaction between the curing agent and the base resin, such as epoxy. Typical ultraviolet radiation sensitive photoinitiators, well known in the art, would include, for example, benzophenone; diethoxy-acetophenone, benzoin methyl ether; benzoin ethyl ether; benzoin isopropyl ether; benzoin isobutyl ether; diethoxy-xanthanone; chlorothio-xanthanone; azo-bis-isobutyronitrile; N-methyl diethanolamine-benzophenone, mixtures thereof, and the like.

The photoinitiators are used in an amount effective to cause polymerization crosslinking of the monomers. This effective amount is between about 0.25 wt.% to about 7.5 wt.% based on the weight of total acrylic and vinyl monomer in the resin system. Use of under about 0.25 wt.% will result in minimal gellation, with subsequent flow during coil wrapping. Use of over about 7.5 wt.% will result in reaction between the initiator itself, causing a self-quenching effect with little monomer linking.

In the method of this invention the flexible substrate, such as kraft paper is continuously fed from a payoff reel to a resin application means, where an adhesive coating of resin, containing monomer and photoinitiator, is applied to one or both surfaces of the paper. The viscosity of the resin should be between about 50 cps. and 5,500 cps., preferably between 100 cps. and 2,500 cps. at 25° C., for good coating and adhesion.

For dry transformer or extreme strength use, the coating can be continuous. Most applications, however, involve patterned resin coated providing insulating tapes for oil cooled transformers. The resin pattern for oil cooled transformer tapes will be applied to provide between about 10 percent to 90 percent total area coverage of the insulation paper, i.e., the resin pattern will constitute 10 to 90 percent of the paper area. Area coverage below about 10 percent will appreciably reduce bond strength of the coated sheet. Area coverage above 90 percent will result in an excellent bond, but due to melt flow during later pressure bonding, may produce an oil impermeable film on the paper. The preferred area coverage is between about 15 to 50 percent. Area coverage can be measured by comparing coated paper with available standard area coverage charts. For dry transformer use, where oil permeation is not a consideration, 100 percent coverage can be used.

The individual patterned, adhesive resin areas should preferably be uniformly distributed over the substrate. Regardless of the shape of the patterned area, the distance from any part in the area to the nearest edge thereof must not exceed 2 inches. The individual resin areas should preferably range between about 1.75 sq. in., as in a 1½ in. diameter circle, to about 0.003 sq. in. as in a 1/16 in. diameter circle.

After adhesive resin application, the resin coated paper is fed to an ultraviolet radiation (UV) source. At this point the moisture content of the paper is still between about 4 wt.% to 15 wt.%. One or a plurality of ultraviolet radiation light sources may be used. Usually, the resin coated paper will be moving on a belt or otherwise pulled by the UV source, at a rate of speed of between about 5 ft./min. to about 120 ft./min., depending on the number of UV sources used.

The UV source will generally be located between 2 inches to 6 inches above the coated paper. When the paper is coated on both sides, a UV source may be used on each side of the coated paper. A typical UV source would be a 200 watt per linear inch mercury lamp. After monomer polymerization, the substantially unreacted epoxy or other base adhesive resin and curing agent would be immobilized in the "B"-staged resin system, yet capable of heat cure at temperatures of over about 100° C. After UV "B"-staging, the moisture content of the paper would still be above 3.5 wt.%. The dry adhesive coated sheet material is still flexible, i.e., it can then be wrapped around an article such as a conductor without cracking. The sheet can then be heated for a time and at a temperature effective to completely cure the dry adhesive.

In the process of making a transformer, the flexible, "B"-staged adhesive resin coated paper is wound on a mandrel to form a central inner insulating tube of a plurality of layers. Low voltage windings are the wound on the inner tube, the winding being of a plurality of copper or aluminum flat foil layers or radially superposed layers of helically wound round or rectangular copper or aluminum wire, insulated with, for example, a resinous enamel such as polyvinyl formal, epoxy, polyimide, polyamide, polyamide-imide, polyester, polyester-imide, acrylic, polyurethane or any other suitable magnet wire enamel. The size of the conductor employed will depend on the specification of the coil and the duties which it has to perform. The resin coated paper is simultaneously wound with the low voltage windings, providing layer insulation between adjacent layers of the winding, layers of wire being separated from each other by the resin coated paper.

Figure 2:
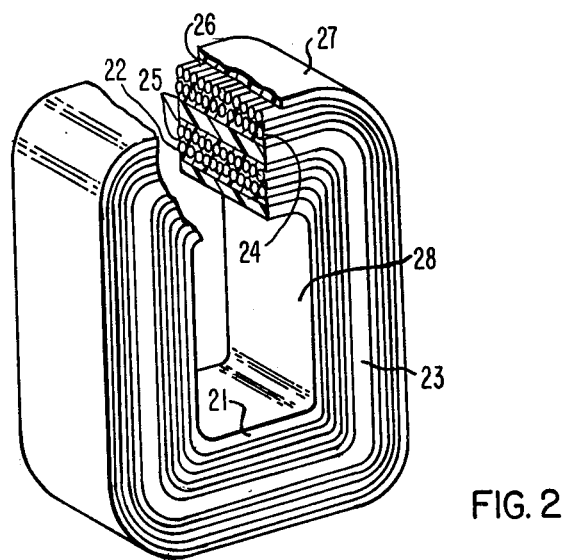
FIG. 2 is a sectional three dimensional view of the windings of a transformer made in accordance with the method of this invention.

In a similar fashion, a high voltage winding is wound simultaneously with the resin coated paper, providing layer insulation between adjacent layers of the winding, layers of wire being separated from each other by the resin coated paper. After the inner low voltage windings and high voltage windings are completed an outer low voltage winding may be added. A spacer consisting of a plurality of layers of resin coated paper may be wound between the low and high voltage windings as shown in FIG. 2, where the inner insulating tube is shown as 21, one of the low voltage windings is shown as 22 and the spacer is shown as 23.

The high and low voltage windings may, in addition, be further separated by duct forming spacers, not shown in the drawing, such as fiber or wooden strips, corrugated fibrous sheet or the like. The number of duct sections will vary depending on cooling requirements at the particular transformer rating. In FIG. 2, one of the high voltage windings is shown as 24, and the layers of interdisposed layer insulation of resin coated paper are shown as 25. The outer layer of radially superposed helically wound wire comprising one of the windings is shown as 26 with outer layer of resin coated paper as 27. A core formed of any suitable magnetic material is placed in space 28, in the center of the electrical coil.

The wound coil assembly can then be placed in an oven or other suitable heating means at a temperature and for a time effective to securely bond the whole assembly by causing a reaction between the base resin and its corresponding curing agent. The adhesive hardens and bonds the various layers of the transformer coil together to form a solid, uniformly bonded, coherent unit. This step must not substantially alter the 10 to 90 percent resin system coverage of the paper when the application is for oil cooled transformers. The curing of thermoset temperature can vary from about 100° C. to 220° C. for about 1 minute to 6 hours, preferably 30 minutes to 180 minutes. The transformer coil is then cooled to room temperature.

It is critical in this final bonding step that the resin remain with substantially the same area coverage of the paper as before curing or thermosetting. The resin bonds the paper to the insulated magnet wire layers and adjacent paper layers and then sets, preventing almost any movement of the wire and paper layers under stress.

In some applications, the wound coil assembly is then placed in its transformer container where a vacuum oil impregnation process takes place. A liquid insulating material, such as cable or transformer oil, is employed preferably in heated and deaerated form as the impregnant. One suitable oil, for example, would contain about 10 wt.% aromatics, have a viscosity index of about 77 and a specific gravity of 0.88 to 0.90 at 16° C. Generally, mineral oils obtained from the heavy distillates fraction of crude petroleum are the most widely used insulating liquids. The unsaturated constituents which would result in poor oxidation stability are removed from the distillate. Small amounts of inhibitors, such as ditert-butyl-p-cresol are added to the oil to improve oxidation stability. These oils have low dielectric constants, about 2 to 2.5, and low dissipation factors, less than about 0.1%.

A vacuum of about 2 mm of Hg is drawn on the tank containing the wound coil assembly and the oil is introduced. The pressure of 2 mm is held from 4 minutes to 15 minutes depending on the size of the coil, until all gas evolution from the coil assembly ceases. At this time the vacuum is generally removed and the pressure in the tank restored to atmospheric pressure. The preferred method is to bond the coil prior to oil impregnation.

While the method of this invention is primarily drawn to making layer insulation for oil cooled distribution transformers, other uses of the resin coated paper of this invention are possible, such as the aforementioned dry transformer applications. The coated paper could also be engaged as insulation for an electrical conductor-insulation combination. The resin coated paper, coated on one side could be used, for example, as a cured outer tape wrapper of a conductor configuration in various types of electrical apparatus, or to wrap and bond various articles such as pancake coils for large power transformers.

EXAMPLE

Ten mil thick, 2"×6" kraft paper strips, having a moisture content of about 5.5 wt.%, and containing about 1 to 3 wt.% stabilizing agent, were used to make samples. They were coated on one side with about a 36 area percent dotted pattern of heat reactive adhesive resin, 1.2 mil thick, by a roller-steel contact mask technique.

Each paper was covered with a thin steel stencil having a 36 area percent dotted pattern cut-out. A portion of wet resin was deposited at one end of the stencil and a steel roller was drawn over the stencil so that the resin was pushed over and covered the stencil. The stencil was then removed, leaving a 36 area percent dotted pattern on each of the strips. The resin was adherent but did not appreciably impregnate the paper.

The resin consisted of the admixture of 13.4 grams of a solid diglycidyl ether of bisphenol A epoxy resin having an Epoxy Equivalent Weight of 575 to 700 and a Durran's melting point of 80° C. to 90° C. (sold commercially by Dow Chemical Co. under the tradename DER 662), dissolved in 4 grams of tetraethylene glycol diacrylate monomer reactive diluent at 70° C. On cooling, a mixture of 4 grams of 2-ethyl hexyl acrylate monomer reactive diluent; 2 grams of an organo-boron type catalyst for the epoxy base resin; and 0.1 gram of benzoin ether ultraviolet radiation sensitive photoinitiator was added. This provided a wet, heat reactive epoxy resin adhesive solution having a viscosity at 25° C. of about 2,000 cps. The monomer was present in the amount of 60 parts by weight per 100 parts epoxy base resin. The photoinitiator was present in the amount of 1.6 wt.% based on the combined weight of acrylate and diacrylate monomer.

When the paper had been coated it was exposed to an ultraviolet, 110 watt/inch, mercury discharge lamp, placed 3 above its surface for about 2 minutes. After 2 minutes, the adhesive resin formed an adherent, dry, dot patterned, coating, indicating that a substantial part of the monomer had polymerized. The coating was not completely cured, but was in the "B"-stage. The paper was flexible, i.e., could be wrapped around a mandrel without cracking. The moisture content of sections of the paper were measured at 4 wt.% by a weight loss technique using a DuPont 900 type thermogravimetric analyzer in the TGA mode. In any commercial application, a 200 to 250 watt/inch UV light would be used, so that "B"-stage time would be reduced to about 10 seconds, rather than the 2 minutes used above, thus reducing further the moisture loss.

Test specimens were then made. Pairs of the 2"×6" dot patterned, coated paper strips were overlapped lengthwise by 2 inches, with the coated sides facing each other. These strip pairs were then placed in a press at 135° C. and 50 lb./in. sq. for 6 hours. After this period, the strips were adhesively bonded together and the epoxy resin system was completely heat cured.

Each test specimen, having 4 in. sq. of overlapped surface and 4 in. long tabs was cut in half lengthwise. One half of each specimen was tested for tensile shear strength at 100° C. The other half was placed in a steel container filled with a highly refined mineral transformer oil for 7 days at 150° C. After this treatment, the tensile shear bond strength was measured at 100° C., using a floor mounted Universal Tensile Testing Instrument, Model TTC, manufactured by Instron Corporation with an incorporated oven in which the samples were mounted. One end of each sample was fixed to the base of the oven and the other to a clamping device with a rod extending through the top of the oven to the testing machine. The rate of pull was 5 in./min. The test results are set out in Table 1:

TABLE 1

| Sample | Total Build | Area Coverage | Tensile Shear (lb./in. sq.) | |
|---|---|---|---|---|
| | | | As Prepared | Oil Treated |
| 1 | 1.2 mil | 36% | 27.0 | 27.2 |
| 2 | 1.2 mil | 36% | 25.0 | 29.0 |
| 3 | 1.2 mil | 36% | 30.3 | 22.9 |
| 4 | 1.2 mil | 36% | 31.2 | 17.3 |

In all cases, before and after oil treatment, the paper tabs broke during the test—accounting for the low shear values. If the tabs had held, values of about 70 lb./in. sq. would be expected even at this low resin build. There was no evidence of epoxy bond failure. This example showed excellent tensile shear strength values, and retention at elevated temperatures in a transformer oil environment similar to that found in a short circuit oil cooled transformer situation.

Similar tests were run with substantially the same test results, except that the paper was continuously run beneath a 200 watt/linear inch mercury discharge lamp at a rate of about 145 in./min. providing about 8 seconds exposure to U.V. light There, the initial moisture content was measured at 5.5 wt.% and the moisture content after UV "B"-staging was measured at 4.3 wt.%.

We claim:

1. A method of making a flexible, resin adhesive coated substrate comprising the steps of:
   (A) applying a surface coating, on at least one side of a porous, flexible sheet material containing at least 4 wt.% moisture without appreciably impregnating the sheet, said coating consisting of a wet, heat reactive adhesive resin, having added thereto from about 10 parts to about 80 parts per 100 parts heat reactive resin of a monomer selected from the group consisting of acrylic monomer, vinyl monomer and mixtures thereof, and an amount of an ultraviolet radiation sensitive photoinitiator effective to cause polymerization of monomer in response to ultraviolet radiation;
   (B) applying ultraviolet radiation to the adhesive resin coating on the sheet material, in a manner and for a time effective to polymerize monomer without the application of heat so that the sheet material retains at least 3.5 wt.% moisture, to form a flexible substrate with a dry, uncured surface coating of adhesive bonded to the sheet material, said adhesive being curable by the application of heat.

2. A method of making a flexible, patterned, porous, resin adhesive coated substrate comprising the steps of:
   (A) applying a surface coating, on at least one side of a moving, flexible, paper sheet material, containing at least 4 wt.% moisture, in a predetermined, discontinuous pattern, without appreciably impregnating the sheet, said coating consisting of a wet, heat reactive adhesive resin, having added thereto from about 10 parts to about 80 parts per 100 parts heat reactive resin of a monomer selected from the group consisting of acrylic monomer, vinyl monomer and mixtures thereof, and an amount of an ultraviolet radiation sensitive photoinitiator effective to cause polymerization of monomer in response to ultraviolet radiation, said adhesive resin pattern coating covering from about 10 percent to 90 percent of the sheet material area;
   (B) applying ultraviolet radiation to the adhesive resin coating on the sheet material, in a manner and for a time effective to polymerize monomer without the application of heat so that the sheet material retains at least 3.5 wt.% moisture to form a flexible substrate with a discontinuous, patterned, dry, uncured surface coating of adhesive bonded to the sheet material, where the sheet is moved by the ultraviolet radiation source at a rate of speed of between about 5 ft./min. to about 120 ft./min.; said adhesive being curable by the application of heat and said adhesive pattern coating covering from about 10 percent to 90 percent of the sheet material area.

3. The method of claim 2, wherein the sheet material is paper having a thickness of between about 1 mil to about 30 mil and a moisture content of between about 4 wt.% and about 15 wt.%, and the viscosity of the coating, containing adhesive resin, monomer and photoinitiator is between about 50 cps. and 5,500 cps.

4. The method of claim 2, wherein the photoinitiator is selected from the group consisting of benzophenone; diethoxy-acetophenone; benzoin methyl ether; benzoin ethyl ether; benzoin isopropyl ether; benzoin isobutyl ether; diethoxy-xanthanone; chlorothio-xanthanone; azo-bis-isobutyronitrile; N-methyl diethanolamine-benzophenone, and mixtures thereof.

5. The method of claim 2, wherein the monomer is present in the amount of from about 20 parts to about 35 parts by weight per 100 parts of heat reactive adhesive resin; and the photoinitiator is present in the amount of from about 0.25 wt.% to about 7.5 wt.% based on the weight of monomer.

6. The method of claim 2, including the additional steps of wrapping the flexible, dry adhesive coated sheet material around an article and then heating the dry coating for a time and at a temperature effective to heat cure the dry adhesive.

7. The method of claim 2, wherein the monomer is selected from the group consisting of 2-ethyl hexyl acrylate; 2-hydroxy ethyl acrylate; 2-methoxy ethyl acrylate; 2-ethoxy ethyl acrylate; 2-phenoxy ethyl acrylate; hexanediol diacrylate; neopentyl glycol diacrylate; tetraethylene glycol diacrylate; trimethylol propane triacrylate; pentaerythritol triacrylate; pentaerythritol tetracrylate; styrene; vinyl toluene; vinyl pyrrolidone; vinyl acetate; divinyl benzene, and mixtures thereof, and the adhesive resin is epoxy resin.

8. The method of claim 1, wherein the viscosity of the coating, containing adhesive resin monomer and photoinitiator, is between about 50 cps. and 5,500 cps., the sheet material is paper having a thickness of between 1 mil to about 30 mil., and the adhesive resin is coated onto and the ultraviolet radiation is applied to a sheet moving at a rate of speed of between about 5 ft./min. to about 120 ft./min.

* * * * *